United States Patent [19]

Jansen

[11] Patent Number: 4,771,459
[45] Date of Patent: Sep. 13, 1988

[54] SYSTEM FOR STORING AND DISTRIBUTING KEYS FOR CRYPTOGRAPHICALLY PROTECTED COMMUNICATION

[75] Inventor: Cornelis J. A. Jansen, Eindhoven, Netherlands

[73] Assignee: U.S. Philips Corp., New York, N.Y.

[21] Appl. No.: 849,606

[22] Filed: Apr. 8, 1986

[30] Foreign Application Priority Data

Apr. 29, 1985 [NL] Netherlands ............ 8501211

[51] Int. Cl.$^4$ ............................................. H04L 9/04
[52] U.S. Cl. .................................. 380/21; 380/25; 380/28
[58] Field of Search ............... 178/22.09, 22.11, 22.10, 178/22.14; 455/26; 179/1.5 R; 375/2.1; 370/60, 93, 94; 380/23–25, 28, 21, 30

[56] References Cited

U.S. PATENT DOCUMENTS

| | | | |
|---|---|---|---|
| 4,182,933 | 1/1980 | Rosenblum | 178/22.09 |
| 4,386,233 | 5/1983 | Smid et al. | 178/22.14 |
| 4,386,234 | 5/1983 | Ehrsam et al. | 178/22.09 |
| 4,399,531 | 8/1983 | Grande et al. | 370/94 |
| 4,411,017 | 10/1983 | Talbot | 455/26 |
| 4,414,661 | 11/1983 | Karlstrom | 370/94 |
| 4,531,020 | 7/1985 | Wechselberger et al. | 178/22.08 |
| 4,531,021 | 7/1985 | Bluestein et al. | 178/22.08 |
| 4,549,308 | 10/1985 | Lo Pinto | 455/26 |
| 4,578,531 | 3/1986 | Everhart et al. | 178/22.11 |
| 4,607,137 | 8/1986 | Jansen et al. | 178/22.14 |

Primary Examiner—Salvatore Cangialosi
Attorney, Agent, or Firm—Emmanuel J. Lobato

[57] ABSTRACT

In a system for storing and distributing keys for cryptographically protected communication each terminal ($T_i$) must be provided with keys. If the system comprises many terminals ($T_i$) each terminal must have a large memory capacity therefor. According to the invention, the terminals are combined in groups ($A_1$, $A_2$) optionally groups of such groups ($B_1$) being formed. By assigning, in each group, keys (g, s) to the terminals belonging to the grop (G, S) the quantity of keys to be stored in each terminal can be significantly reduced.

2 Claims, 2 Drawing Sheets

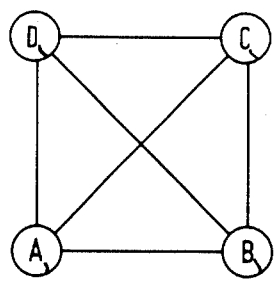
FIG. 1a
|   | A | B | C | D |
|---|---|---|---|---|
| A | — | $k_{ab}$ | $k_{ac}$ | $k_{ad}$ |
| B | $k_{ab}$ | — | $k_{bc}$ | $k_{bd}$ |
| C | $k_{ac}$ | $k_{bc}$ | — | $k_{cd}$ |
| D | $k_{ad}$ | $k_{bd}$ | $k_{cd}$ | — |
FIG. 1b
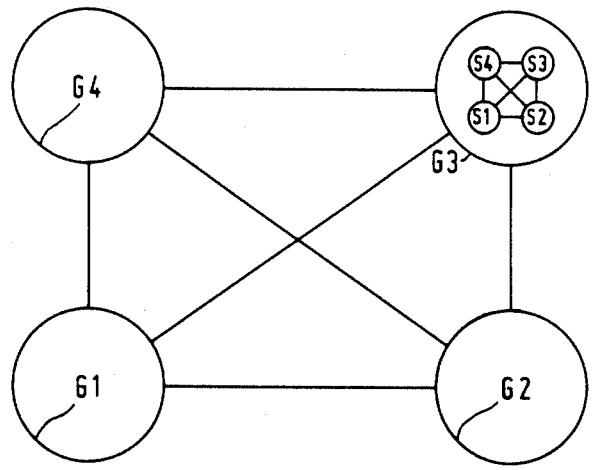
FIG. 2a
|   | G1 | G2 | G3 | G4 |   |   | S1 | S2 | S3 | S4 |
|---|---|---|---|---|---|---|---|---|---|---|
| G1 | $g_{11}$ | $g_{12}$ | $g_{13}$ | $g_{14}$ | | S1 | $s_{11}$ | $s_{12}$ | $s_{13}$ | $s_{14}$ |
| G2 | $g_{21}$ | $g_{22}$ | $g_{23}$ | $g_{24}$ | | S2 | $s_{21}$ | $s_{22}$ | $s_{23}$ | $s_{24}$ |
| G3 | $g_{31}$ | $g_{32}$ | $g_{33}$ | $g_{34}$ | | S3 | $s_{31}$ | $s_{32}$ | $s_{33}$ | $s_{34}$ |
| G4 | $g_{41}$ | $g_{42}$ | $g_{43}$ | $g_{44}$ | | S4 | $s_{41}$ | $s_{42}$ | $s_{43}$ | $s_{44}$ |
FIG. 2b

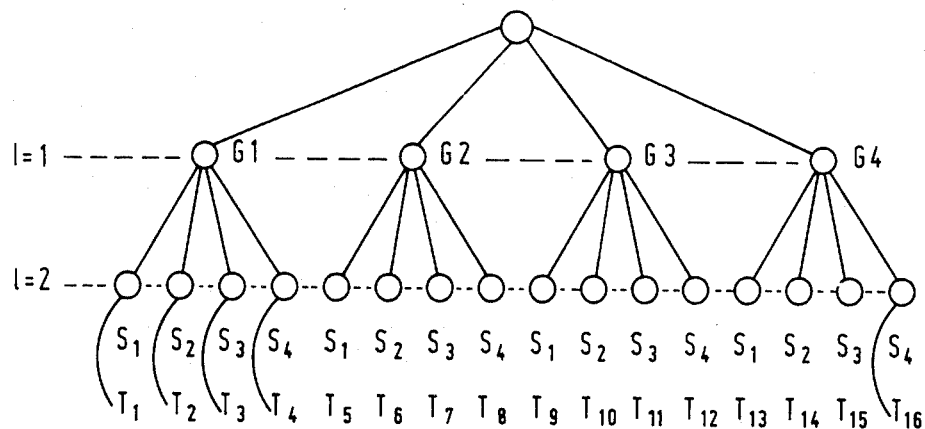
FIG. 3a
$T_1 \longrightarrow T_{14} : s_{12}\ g_{14}$
$T_2 \longrightarrow T_{13} : s_{21}\ g_{14}$
$T_2 \longrightarrow T_3 : s_{23}\ g_{11}$
$T_6 \longrightarrow T_7 : s_{23}\ g_{22}$
FIG. 3b
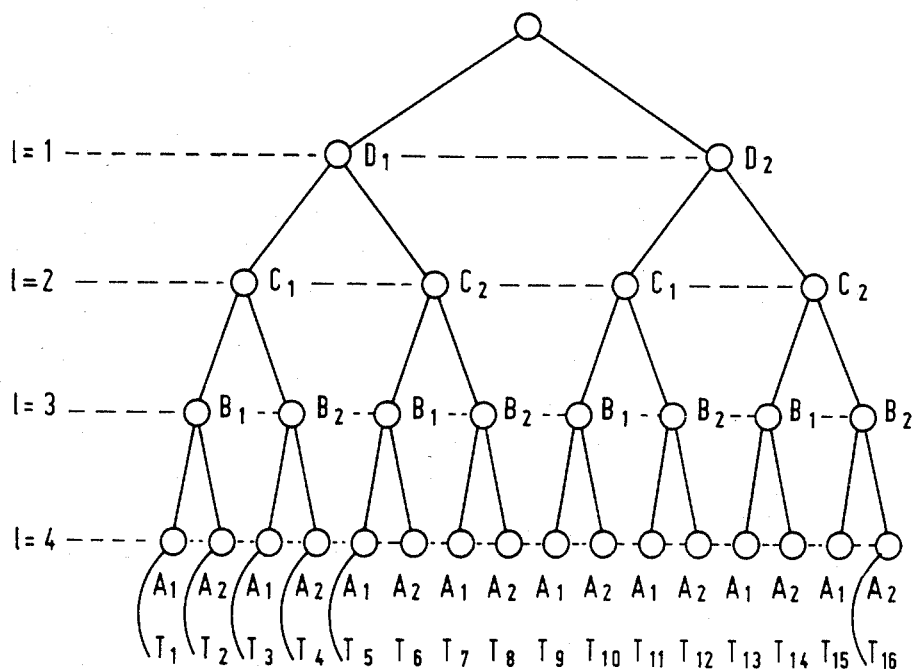
FIG. 4 ns are possible between the N terminals. If each terminal has (N−1) keys available, namely all the keys of the associated row or column of the key matrix, then each terminal can communicate with all the other (N−1) terminals. For large values of N the required memory capacity becomes unacceptably large, as a numerical example given in the foregoing shows.

SYSTEM FOR STORING AND DISTRIBUTING KEYS FOR CRYPTOGRAPHICALLY PROTECTED COMMUNICATION

BACKGROUND OF THE INVENTION

The invention relates to a system for storing and distributing keys for cryptographically protected communication, the system comprising a plurality of terminals which are interconnectable, each terminal comprising a transmitter, a receiver, an enciphering and a deciphering arrangement and a memory arrangement storing the keys for enciphering the clear data to be transmitted by the terminal and deciphering the enciphered data to be received by the terminal.

Such a system is generally known.

In a network having N terminals there are $(_2^N) = \frac{1}{2} N(N-1)$ possible communication links between two terminals if it is assumed that the communication direction is not of significance. By storing in each terminal $(N-1)$ keys a connection can be established to any other terminal, which connection is protected by a unique key. The key material for the overall network of N terminals can be represented as a N.N key matrix. A key matrix is a square matrix each element of which represents an enciphering or a deciphering key. The matrix has no elements on the main diagonal (communication of the terminal with itself is non-existent) and is symmetrical (the same key is used for communication between terminal i and terminal j and for the communication between j and i). By storing in each terminal the $(N-1)$ keys shown in the relevant column (or the row) of the key matrix, each terminal (for example $T_i$) can safely communicate with any other terminal (for example $T_j$) via their common key (terminal $T_i$ utilizes key $k_{ij}$ and terminal $T_j$ utilizes key $k_{ji}$, which keys are identical since the key matrix is symmetrical). This method, although simple, is not attractive if the number of terminals in the network is large, as the required storage capacity S in each terminal for storing the $(N-1)$ keys amounts to $(N-1).L$ bits, L being the length of the keys in bits. If N has a value of 10 000 and the key length L is 150 bits, then each terminal must have a storage capacity S of 1.5 Mbits.

SUMMARY OF THE INVENTION

The invention has for its object to provide a system of the type defined in the opening paragraph, in which terminals having a limited storage capacity for storing enciphering and deciphering keys are sufficient. To accomplish this, according to the invention the system described in the opening paragraph is characterized in that the terminals are classified in a hierarchy of groups, this hierarchy having l levels ($l \geq 2$), that the first, highest level ($1=1$) is formed by upper groups of $n_{l=1}$ terminals each, that a unique upper group key matrix is associated with each upper group and that in the memory arrangement of the $i^{th}$ terminal ($i=1, 2, \ldots n_1$) of an upper group the $i^{th}$ column and the $i^{th}$ row of the upper group key matrix are stored, that the lowest level ($l = l_{max}$) is formed by a plurality of sub-groups each having $n_l$ terminals, that a unique lower group key matrix is associated with each lower group and that the $j^{th}$ row and the $j^{th}$ column of the relevant lower group key matrix are stored in the storage arrangement of the $j^{th}$ terminal ($j=1, 2, \ldots n_{lmax}$), that—if $l > 2$—one or a plurality of intermediate levels are arranged between said highest and lowest levels, the intermediate levels each comprising a plurality of intermediate groups each having $n_l$ terminals, the intermediate groups having been obtained by dividing the groups present in the next higher level, that a unique intermediate group key matrix is associated with each intermediate group and that in the memory arrangement of the $k^{th}$ terminal of each intermediate group the $k^{th}$ column and the $k^{th}$ row of the relevant intermediate group key matrix are stored, that each terminal includes means for determining a conversation key for secret communication with any other terminal of the rows and columns of key elements stored in the memory arrangement of the terminal, this conversation key being formed from the key elements both terminals have in common and the conversation key containing a key element from the key matrix of each level.

The system according to the invention has the advantage that the required storage capacity can be reduced in a terminal depending on the number of (intermediate) levels, by a factor of 10 to 100 in those cases in which the number of terminals belonging to the network is large (for example more than 1000).

It is advantageous if the number of upper groups amounts to 2, the number of terminals per sub-group also amounts to 2 and that if $l > 2$, the number of intermediate groups associated with the intermediate group next higher in hierarchy also amounts to 2. In this case the number of keys to be stored must be at a minimum.

BRIEF DESCRIPTION OF THE DRAWING

An embodiment of the invention will now be described in greater detail by way of example with reference to the accompanying drawings.

FIG. 1 is a schematic representation of a prior art crypto-communication system;

FIG. 2 is a schematic representation of a first crypto-communication system embodying the invention;

FIG. 3 is an alternative representation of the system of FIG. 2; and

FIG. 4 is a schematic illustration of a second crypto-communication system embodying the invention.

DETAILED DESCRIPTION OF THE INVENTION

FIG. 1a shows a prior art communication system which, by way of example, is formed by four terminals A, B, C and D. Each terminal is connectable to any of the other terminals. The key matrix associated with this network is illustrated in FIG. 1b and comprises a square symmetrical 4×4 matrix formed from the elements $k_{ij}$, wherein $i = a, b, c, d$ and $j = a, b, c, d$. The main diagonal of the matrix is stored as a result of which terminal B, for example, can utilize the column of key elements $k_{ab}$, $k_{bc}$, $k_{bd}$. The key matrix has a total of 6 different keys and each terminal contains 3 different keys from this total number of keys. If terminals B and C want to communicate they inform each other thereof. Thereafter terminal B selects from the key material it has at its disposal the (sole) key it has in common with terminal C, i.e. $k_{bc}$. Terminal C does the same and automatically selects the same key as terminal B. Although this system is cryptographically safe (even if all the keys of terminal A and/or D are known to an unauthorized communication participant, the latter is not capable of overhearing the connection BC), the required key storage capacity of each terminal memory is rather high, as in a system consisting of N terminals $(_2^N) = \frac{1}{2} N(N-1)$ connection possibilities can be distinguished and for each terminal (N−1) different keys of the total of ½ N(N−1) different keys must be stored. If N is large, for example 10,000, then this requires a memory storage capacity in each terminal of 1.5 Mbits if a key contains 150 bits.

The system according to the invention has for its object to reduce the required storage capacity. FIG. 2 shows such a system. The system comprises groups of terminals $G_1$, $G_2$, $G_3$ and $G_4$, each group containing a plurality of terminals. Group $G_3$, for example, includes terminals $S_1$, $S_2$, $S_3$ and $S_4$, which terminals are interconnectable. The groups $G_1$, $G_2$, $G_3$ and $G_4$ are also interconnectable. It is proposed to arrange the system so that there is an association both between terminals within a group having a certain key matrix (the S matrix in FIG. 2b) and also between the groups themselves (the G-matrix in FIG. 2b). The sizes of the S and G matrices are determined by the number of terminals per group or the number of groups in the system, as the case may be. Although in FIG. 2 a size of 4 has been chosen for both matrices, this is in no way essential to the invention. The network may be divided into any number of groups and each group may comprise any number of terminals. There is no requirement that the number of groups be equal to the number of terminals per group.

The method of effecting a protected connection will now be described partly with reference to FIG. 3. To that end, FIG. 3a illustrates the drawing of FIG. 2a in a different way, showing the hierarchy between terminals and group. At the highest level (l=1) the groups $G_1$... $G_4$ are shown. Each group "heads" four terminals, for example $T_1$, $T_2$, $T_3$ and $T_4$ which are arranged at a second level (l=2). In each terminal the following key material is stored:

(a) the row and the column of the key matrix G of the group to which the terminal belongs. So, for example, all the terminals in group G2 are provided with keys $g_{12}$, $g_{22}$, $g_{32}$, $g_{42}$, $g_{21}$, $g_{23}$ and $g_{24}$.

(b) the row and the column of the key matrix S associated with the terminal. So, for example, $T_7$ (FIG. 3a) of group $G_2$ comprises in addition to the keys obtained because of (a) the keys $s_{13}$, $s_{23}$, $s_{33}$, $s_{43}$, $s_{31}$, $s_{32}$ and $s_{34}$.

To protect the path between, for example, terminals $T_1$ and $T_{14}$ these terminals utilize a combination of the keys which they have in common in both the S and the G matrices, i.e. as can be seen from FIG. 2b, $s_{12}$, $g_{14}$. This combination may, for example, be what is commonly referred to as "oneway function". Such a function has the property that it is easy to determine the function k in accordance with $k = r(S_1, S_2... S_p)$ but that it is very difficult (substantially impossible) to determine the elements $S_1, S_2... S_p$ from k. This example, and a few further examples, are illustrated in FIG. 3b.

If the required storage capacity is compared, then it is found that in the example of FIGS. 2/3 in which only 16 terminals are included in a network, the reduction in memory storage capacity is extremely marginal: in the prior art system (FIG. 1) N−1=15 keys should be stored, whilst in the system according to the invention (FIGS. 2/3) 2(2n−1)=14 keys must be stored. The advantage of the invention, however, becomes obvious if the number of terminals exceeds 1000. If N=10 000, then in the first case 9999 keys must be stored and in the second case only 398, i.e. a factor of 25 less.

The required storage capacity can further be reduced by increasing the number of levels (l). In FIG. 4 a network formed by 16 terminals is hierarchically divided into 4 levels. Each sub-group D at level l=1 contains two intermediate groups namely $C_1$ and $C_2$ at level l=2, whilst each intermediate group $C_1$, $C_2$ contains two further intermediate groups namely $B_1$ and $B_2$. Finally, the intermediate groups $B_1$, $B_2$ each contain two sub-groups, namely $A_1$ and $A_2$. In each terminal a row and a column of the key matrix of each of the (four) levels must now be stored. Since a 2×2 matrix is associated with each level, the number of keys to be stored is 4.3=12 keys instead of 15 and 14, respectively in the system of FIG. 1 and FIGS. 2/3. For large numbers the advantage is again more obvious: in the case in which N=10,000, only 76 keys must be stored for each terminal.

Generally it holds that for a prior art network having N terminals the required key storage capacity S can be determined from $$S = (N-1) \cdot L \text{ bits} \qquad (1)$$

if no hierarchy is used, as in the system described with reference to FIG. 1, and in that case the total of the number of different keys is $$K_1 = \tfrac{1}{2} N \cdot (N-1) \qquad (2)$$

In the system according to the invention, for the case in which the network is divided into l levels (l>2), $N_i$ sub-groups being present at level i, a total of $$S_1 = \left( -1 + 2 \sum_{i=1}^{l} N_i \right) \cdot L \qquad (3)$$

different keys must be stored for each terminal $$\left( \text{wherein } \prod_{i=1}^{l} N_i = N \right).$$

The network has at its disposal a total of $$K_1 = \sum_{i=1}^{l} N_i^2 \qquad (4)$$

different keys. It has been found that $S_1$ is a minimum when the number of terminals for each group and the number of subgroups per group are each chosen equal to 2. So in that case it holds that $$l = \log_2 N; \qquad (5)$$

the number of keys to be stored for each terminal amounts to $$S_{opt} = 3 \cdot \log_2 N \qquad (6)$$

and the total number of different keys amounts to:

$$K_{opt} = 4 \cdot \log_2 N. \qquad (7)$$

In Table I the above formulae are elaborated for a network having N=4096 terminals. The first line in the Table relates to the prior art system; the second and further lines relate to the system according to the invention. The last line thereof indicates the hierarchic division for the case in which the minimum number of keys per terminal (36) is desired.

TABLE I

| l | $N_l$ | $S_p/L$ | $K_p$ |
| --- | --- | --- | --- |
| 1 | 4096 | 4095 | 8.386.560 |
| 2 | 64 | 254 | 8.192 |
| 3 | 16 | 93 | 768 |
| 4 | 8 | 60 | 256 |
| 6 | 4 | 42 | 96 |
| 12 | 2 | 36 | 36 |

What is claimed is:

1. A system for storing and distributing keys for cryptographically protected communication, the system comprising: a plurality of terminals which are interconnectable, each terminal comprising a transmitter, a receiver, an enciphering and a deciphering arrangement and a memory arrangement storing the keys for enciphering the clear data to be transmitted by the terminal and deciphering of the enciphered data to be received by the terminal, characterized in that the terminals are classified in a hierarchy of groups, this hierarchy having l levels (l>2) that the first, highest level (l=1) is formed by upper groups of $n_l=1$ terminals each, that a unique upper.group key matrix is associated with each upper group and that in the memory arrangement of the $i^{th}$ terminal (i=1, 2, ... $n_l$) of an upper group the $i^{th}$ column and the $i^{th}$ row of the upper group key matrix are stored, that the lowest level (l=$l_{max}$) is formed by a plurality of sub-groups each having $n_l$ terminals, that a unique lower group key matrix is associated with each lower group and that the $j^{th}$ row and the $j^{th}$ column of the relevant sub-group key matrix is stored in the memory arrangement of the $j^{th}$ terminal (j=1, 2, ... $n_{lmax}$) that if l>2 one or a plurality of intermediate levels are arranged between said highest and lowest levels, the intermediate levels each comprising a plurality of intermediate groups each having $n_l$ terminals, the intermediate groups having been obtained by dividing the groups present in the next higher level, that a unique intermediate group key matrix is associated with each intermediate group and that in the memory arrangement of the $k^{th}$ terminal of each intermediate group the $k^{th}$ column and the $k^{th}$ row of the relevant intermediate group key matrix are stored, that each terminal includes means for determining a conversation key for secret communication with any other terminal of the row and column key elements stored in the memory arrangement of the terminal, this conversation key being formed from the key elements the two terminals have in common and the conversation key containing a key element from the key matrix of each level.

2. A system for storing and distributing keys as claimed in claim 1, characterized in that the number of upper groups amounts to 2, the number of terminals of each sub-group also amounts to 2 and that if l>2, the number of intermediate groups associated with the intermediate groups next higher in hierarchy also amounts to 2.

* * * * *